United States Patent
Kim et al.

(10) Patent No.: US 11,248,146 B2
(45) Date of Patent: Feb. 15, 2022

(54) POLYVINYL ACETAL RESIN COMPOSITION, FILM FOR LAMINATED GLASS, AND LAMINATED GLASS

(71) Applicant: SKC Co., Ltd., Suwon-si (KR)

(72) Inventors: Hyejin Kim, Suwon-si (KR); Sungjin Chung, Seoul (KR)

(73) Assignee: SKC Co., Ltd., Suwon-si (KR)

( * ) Notice: Subject to any disclaimer, the term of this patent is extended or adjusted under 35 U.S.C. 154(b) by 0 days.

(21) Appl. No.: 17/342,947

(22) Filed: Jun. 9, 2021

(65) Prior Publication Data

US 2021/0395574 A1 Dec. 23, 2021

Related U.S. Application Data

(63) Continuation of application No. PCT/KR2019/010301, filed on Aug. 13, 2019.

(30) Foreign Application Priority Data

Dec. 10, 2018 (KR) .................. 10-2018-0157943

(51) Int. Cl.
| | |
|---|---|
| *B32B 27/22* | (2006.01) |
| *B32B 27/30* | (2006.01) |
| *C09J 11/06* | (2006.01) |
| *C09J 7/38* | (2018.01) |
| *B32B 17/10* | (2006.01) |

(52) U.S. Cl.
CPC .......... *C09J 7/381* (2018.01); *B32B 17/10036* (2013.01); *B32B 17/10761* (2013.01); *B32B 27/22* (2013.01); *B32B 27/30* (2013.01); *C09J 11/06* (2013.01); *B32B 2315/08* (2013.01); *B32B 2329/06* (2013.01); *B32B 2419/00* (2013.01); *B32B 2605/006* (2013.01); *B32B 2605/08* (2013.01); *C09J 2400/146* (2013.01); *C09J 2431/00* (2013.01)

(58) Field of Classification Search
None
See application file for complete search history.

(56) References Cited

U.S. PATENT DOCUMENTS

2013/0288061 A1* 10/2013 Kitano ............... C08K 5/07
428/437

FOREIGN PATENT DOCUMENTS

| CN | 1049674 A | 3/1991 |
|---|---|---|
| CN | 103261113 A | 8/2013 |
| JP | 8-119687 A | 5/1996 |
| JP | 10-139496 A | 5/1998 |
| JP | 2008-119927 A | 5/2008 |
| JP | 2008-195557 A | 8/2008 |
| JP | 2009-45874 A | 3/2009 |
| JP | 2015-151326 A | 8/2015 |
| KR | 10-2014-0147516 A | 12/2014 |

OTHER PUBLICATIONS

Korean Office Action dated Mar. 9, 2020 in counterpart Korean Patent Application No. 10-2018-0157943 (6 pages in English and 5 pages in Korean).
Korean Notice of Allowance dated Sep. 15, 2020 in counterpart Korean Patent Application No. 10-2018-0157943 (2 pages in English and 5 pages in Korean).
International Search Report dated Dec. 5, 2019 in counterpart International Patent Application No. PCT/KR2019/010301 (2 pages in English and 2 pages in Korean).

* cited by examiner

*Primary Examiner* — Sheeba Ahmed
(74) *Attorney, Agent, or Firm* — NSIP Law (57) ABSTRACT

The polyvinyl acetal resin composition includes: a polyvinyl acetal resin, a plasticizer, a metal salt compound, and a benzotriazole-based compound, wherein the metal salt compound is a metal salt of hydroxyl carboxyl acid having two to sixteen carbon atoms, wherein the metal salt compound is included in an amount of less than 0.05 wt % based on a total weight of the polyvinyl acetal resin composition, and wherein the metal salt compound is included in an amount of 16 parts by weight or less based on the benzotriazole-based compound of 100 parts by weight.

20 Claims, 3 Drawing Sheets

POLYVINYL ACETAL RESIN COMPOSITION, FILM FOR LAMINATED GLASS, AND LAMINATED GLASS

CROSS-REFERENCE TO RELATED APPLICATIONS

Pursuant to 35 USC 120 and 365(c), this application is a continuation of International Application No. PCT/KR2019/010301 filed on Aug. 13, 2019, and claims the benefit under 35 USC 119(a) of Korean Application No. 10-2018-0157943 filed on Dec. 10, 2018, in the Korean Intellectual Property Office, the entire disclosures of which are incorporated herein by reference for all purposes.

BACKGROUND

1. Field

The present disclosure relates to a polyvinyl acetal resin composition with enhanced durability, a film for laminated glass, and a laminated glass.

2. Description of Background

In general, laminated glass (e.g., tempered glass and safety glass) consisting of a pair of glass panels and a synthetic resin film inserted therebetween is widely used for window glass in road vehicles such as automobiles and buildings due to its enhanced safety, because its fragments are not scattered even when the glass is broken. A polyvinyl acetal resin having a high affinity for inorganic materials is often utilized in the film applied to such laminated glass.

A laminated glass including a film placed between a pair of glass panels has basic properties required for a laminated glass such as penetration resistance and anti-scattering of glass fragments, but moisture resistance of the laminated glass may be degraded, and in this case, an interlayer of the laminated glass may generate a whitening phenomenon in the periphery when directly being in contact with air in a humid atmosphere. Therefore, an additive for adjusting adhesive strength between a film and a glass is used to prevent such a whitening phenomenon or the like.

Japanese Patent Publication No. 1998-139496 (Application No. 1996-290261) discloses a film, the whitening of which may be prevented as an interlayer for a laminated glass including a polyvinyl butyral, a plasticizer, a carboxyl metal salt, and a denatured silicon oil. However, the film may lower compatibility with a polyvinyl butyral resin and increase a haze value of the final film due to use of a denatured silicon oil having a low polarity. Also, the functional group of the glass to react with a hydroxyl group of the polyvinyl butyral resin is disturbed by the denatured silicon oil, and thereby has a significantly degraded adhesive strength, such that penetration resistance and impact resistance of the film is degraded.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, the polyvinyl acetal resin composition includes: a polyvinyl acetal resin, a plasticizer, a metal salt compound, and a benzotriazole-based compound, wherein the metal salt compound is a metal salt of hydroxyl carboxyl acid having two to sixteen carbon atoms, wherein the metal salt compound is included in an amount of less than 0.05 wt % based on a total weight of the polyvinyl acetal resin composition, and wherein the metal salt compound is included in an amount of 16 parts by weight or less based on the benzotriazole-based compound of 100 parts by weight.

The metal salt compound may include a carboxyl anion having three to six carbon atoms and a hydroxyl group inside the metal salt compound, and a monovalent metal cation salt.

The metal salt compound may include a carboxyl anion having six to twelve carbon atoms and a hydroxyl group inside the metal salt compound, and a divalent metal cation salt.

The metal salt compound may include one or two hydroxyl group inside the metal salt compound.

The metal salt compound may be a branched compound or a linear compound.

The metal salt compound may be a compound represented by the following Formula 1:

[Formula 1]

wherein, in Formula 1, m1 is an integer of 0 to 5, n is 1 or 2, and M is sodium (Na), potassium (K), or magnesium (Mg).

The metal salt compound may be a compound represented by the following Formula 2:

[Formula 2]

wherein, in Formula 2, m2 is an integer of 0 to 5, n is 1 or 2, and M is sodium (Na), potassium (K), or magnesium (Mg).

The metal salt compound may be a compound represented by the following Formula 3:

[Formula 3]

wherein, in Formula 3, m3 and m4 are respectively independent integers of 0 to 5, at least one of m3 and m4 is not 0, n is 1 or 2, and M is sodium (Na), potassium (K), or magnesium (Mg).

In another general aspect, the film for laminated glass includes: a film; and an adhesion layer disposed on a surface of the film, wherein the adhesion layer includes a polyvinyl acetal resin, a plasticizer, an adhesion regulator, and a benzotriazole-based compound, wherein the adhesion regulator includes a metal salt compound, which is a metal salt of hydroxyl carboxyl acid having two to sixteen carbon atoms, or an anion of the same, and wherein the metal salt compound is comprised in an amount of 16 parts by weight or less based on the benzotriazole-based compound of 100 parts by weight.

The adhesion regulator may have an adhesion regulation effect $E_{aca}$ per 0.1 wt % of the adhesion regulator based on a solid content, calculated by below Equation 1, and may be 15 or more;

$$E_{aca} = \frac{PVcs - PVss}{ACA} \times 0.1 \quad \text{[Equation 1]}$$

wherein, in Equation 1, PVcs is a pummel value of a comparative reference sample not including the adhesion regulator, PVss is a pummel value of a sample including the adhesion regulator, and ACA is an amount (wt %) of the solid content of the adhesion regulator based on a total weight of the adhesion layer.

A yellow index variation of the film may be 3.0 or less between before and after being kept for two weeks in an isothermal-iso humidity chamber at 65° C. and 95% rh.

The metal salt compound may include one or two hydroxyl group inside the metal salt compound.

The metal salt compound may be a branched compound or a linear compound.

The metal salt compound may be a compound represented by the following Formula 1:

[Formula 1]

wherein, in Formula 1, m1 is an integer of 0 to 5, n is 1 or 2, and M is sodium (Na), potassium (K), or magnesium (Mg).

The metal salt compound may be a compound represented by the following Formula 2:

[Formula 2]

wherein, in Formula 2, m2 is an integer of 0 to 5, n is 1 or 2, and M is sodium (Na), potassium (K), or magnesium (Mg).

The metal salt compound may be a compound represented by the following Formula 3:

[Formula 3]

wherein, in Formula 3, m3 and m4 are respectively independent integers of 0 to 5, at least one of m3 and m4 is not 0, n is 1 or 2, and M is sodium (Na), potassium (K), or magnesium (Mg).

The adhesion regulator may include a compound selected from the group consisting of potassium 2-hydroxypropanoate, potassium 3-hydroxybutanoate, magnesium 3-hydroxy-3-methylbutyrate, sodium 5-hydroxydecanoate and a combination thereof.

In still another general aspect, the laminated glass includes: a plurality of glass sheets; and a laminated body including the film for laminated glass interposed between the plurality of glass sheets.

An average whitening distance of the laminated glass with a size of 100 mm×100 mm measured after being kept for two weeks in an isothermal-iso-humidity chamber at 65° C. and 95% rh may be 6 mm or less.

A number of bubbles occurred in the laminated glass with a size of 100 mm×100 mm after being kept for 12 hours in an oven at 140° C. and taken out may be less than 5.

Other features and aspects will be apparent from the following detailed description and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the drawings and the detailed description, the same reference numerals refer to the same elements. The drawings may not be to scale, and the relative size, proportions, and depiction of elements in the drawings may be exaggerated for clarity, illustration, and convenience.

Throughout the present disclosure, the phrase "combination(s) thereof" included in a Markush-type expression denotes one or more mixtures or combinations selected from the group consisting of components stated in the Markush-type expression, that is, denotes that one or more components selected from the group consisting of the components are included.

Throughout the present disclosure, the phrase that a certain element "comprises" or "includes" another element means that the certain element may further include one or more other elements but does not preclude the presence or addition of one or more other elements, unless stated to the contrary.

Throughout the present disclosure, when a composition is "connected" to another composition, this includes not only 'directly connected' but also 'connected with another composition in the middle.'

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Throughout the present disclosure, terms such as "first," "second," "A," or "B" are used to distinguish the same terms from each other. The singular forms "a," "an," and "the" include the plural form unless the context clearly dictates otherwise.

In the present disclosure, the term "X-based" may mean that a compound includes a compound corresponding to X, or a derivative of X.

In the present disclosure, "B being placed on A" means that B is placed in direct contact with A or placed over A with another layer or structure interposed therebetween and thus should not be interpreted as being limited to B being placed in direct contact with A, unless the description clearly dictates.

In the present disclosure, a singular form is contextually interpreted as including a plural form as well as a singular form unless specially stated otherwise.

Hereinafter, the present disclosure will be described in further detail.

The object of the present disclosure is to provide a polyvinyl acetal resin composition, a film for laminated glass, and a laminated glass with an excellent adhesive strength and enhanced durability such as moisture resistance even though an adhesion regulator in a small amount is applied thereto.

The present disclosure provides a polyvinyl acetal resin composition, a film for laminated glass, a laminated glass, and the like for manufacturing a film for laminated glass having an excellent adhesion regulation effect confirmed by a pummel adhesion by applying an active metal salt compound, with enhanced durability such as moisture resistance.

The inventors of the present disclosure have recognized that, when a metal salt compound is applied in a comparatively large amount, yellowing phenomenon easily occurs and in a process of conducting research for solving the problem, have verified that, when an additive possible to effectively adjust adhesive strength even in a less amount is applied, excellent adhesion regulation effect and at the same time durability enhancing effect can be achieved, and thus have completed this invention.

In a general aspect, the polyvinyl acetal resin composition according to one embodiment of the present disclosure includes a polyvinyl acetal resin, a plasticizer, and a metal salt compound, which is a metal salt of hydroxyl carboxyl acid having two to sixteen carbon atoms.

The polyvinyl acetal may be a polyvinyl acetal obtained by acetalization of a polyvinyl alcohol having a polymerization degree of 1,600 to 3,000 using an aldehyde, or a polyvinyl acetal obtained by acetalization of a polyvinyl alcohol having a polymerization degree of 1,700 to 2,500 using an aldehyde. When such a polyvinyl acetal is applied, mechanical properties like penetration resistance can be sufficiently enhanced.

The polyvinyl acetal may be synthesized from a polyvinyl alcohol and an aldehyde, and the aldehyde is not limited. In detail, the aldehyde may be selected from the group consisting of n-butyl aldehyde, isobutyl aldehyde, n-valer aldehyde, 2-ethyl butyl aldehyde, n-hexyl aldehyde, and a mixture thereof. When n-butyl aldehyde is applied as the aldehyde, the manufactured polyvinyl acetal resin may have a refractive index not much different from a refractive index of glass, and excellent adhesive strength with glass and the like may be obtained.

The plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibu oxyethoxyethyl adipate (DBEA), butyl carbitol adipate (DBEEA), dibutyl sebacate (DBS), bis 2-hexyl adipate (DHA), and a mixture thereof, and more specifically, triethylene glycol bis 2-ethylhexanoate (3G8) may be applied as the plasticizer.

The metal salt compound acts as a regulator of adhesive strength between a surface of a glass and a surface of the film for laminated glass, and includes a plasticizer and a metal salt compound, which is a metal salt of hydroxyl carboxyl acid having two to sixteen carbon atoms. The metal salt compound may include one or two hydroxyl group inside the molecule.

The metal salt compound or a carboxylic anion having a hydroxyl group included in the metal salt disturbs bonding of the hydroxyl group included in the polyvinyl acetal resin with a surface of glass, and may preferably have two to sixteen carbon atoms. When more than sixteen carbon atoms are included in the metal salt compound or anion, the compound itself may have more non-polarity such that a possibility of bubble occurrence may be higher in the laminate glass.

The metal salt compound or the carboxylic anion having a hydroxyl group included in the metal salt may have a branched or linear structure, and preferably may have a branched structure. When the metal salt compound or the anion is applied in a branched structure, the adhesion between the hydroxyl group and the surface of the glass can be more effectively disturbed by the cubic structure of the compound or the anion.

The metal salt may be a metal salt of a monovalent metal having three to six carbon atoms or an anion of the same.

The metal salt may be a metal salt of a divalent metal having six to twelve carbon atoms or an anion of the same.

The metal salt or the anion may include one or two hydroxyl group inside the molecule.

The metal cation included in the metal salt may be selected from the group consisting of sodium (Na) monovalent cation, magnesium (Mg) divalent cation, and potassium (K) monovalent cation.

Specifically, the metal salt compound may be a compound represented by the following Formula 1:

[Formula 1]

wherein, in Formula 1, m1 is an integer of 0 to 5, n is 1 or 2, and M is sodium (Na), potassium (K), or magnesium (Mg).

The metal salt compound may be a compound represented by the following Formula 2:

[Formula 2]

wherein, in Formula 2, m2 is an integer of 0 to 5, n is 1 or 2, and M is sodium (Na), potassium (K), or magnesium (Mg).

The metal salt compound may be a compound represented by the following Formula 3:

[Formula 3]

wherein, in Formula 3, m3 and m4 are respectively independent integers of 0 to 5, at least one of m3 and m4 is not 0, n is 1 or 2, and M is sodium (Na), potassium (K), or magnesium (Mg).

Alternatively, the metal salt compound may be any combination of compounds represented by the above Formula 1-3.

Specifically, the metal salt compound may include a compound selected from the group consisting of potassium 2-hydroxypropanoate, potassium 3-hydroxybutanoate, magnesium 3-hydroxy-3-methylbutyrate, sodium 5-hydroxydecanoate, and a combination thereof.

The metal salt compound may be applied to the composition in a state of an intact metal salt compound or an ionized state by being dissolved in a solvent, and may serve as an adhesion regulator. In detail, it can regulate adhesive strength between the film and a surface of a glass. When the metal salt compound is applied in a state of solution, it is possible to disperse the metal salt compound or the anion of the same more evenly inside the manufactured film or the adhesion layer.

The metal salt compound is particularly preferable in that, even with a small amount, the composition can obtain an excellent adhesion regulation effect.

The metal salt compound or the anion of the same may have an adhesion regulation effect (a value calculated by Equation 1 described below) of 15 to 45, or 18 to 43 based on a pummel adhesion test per 0.1 wt % thereof based on a total weight of the adhesion layer.

The metal salt compound or the anion of the same may have an adhesion regulation effect (a value calculated by Equation 1 described below) of 20 to 42, or 23 to 41 based on a pummel adhesion test per 0.1 wt % thereof based on a total weight of the adhesion layer.

When having such an adhesion regulation effect, the metal salt compound can obtain an excellent adhesion regulation effect even with a small amount applied to the composition, and can minimize adverse effects possible to be caused in the manufactured film due to inclusion of the metal ion.

The metal salt compound may be included in an amount of less than 0.05 wt %, 0.03 wt % or less, or 0.001 to 0.03 wt % based on the entire composition. The metal salt compound is included in an amount described above based on the total weight of the polyvinyl acetal resin composition, thereby can manufacture a monolayer film for laminated glass, and when manufacturing a multilayer film for laminated glass, a surface layer (adhesion layer) can be formed of the composition including the metal salt compound.

The polyvinyl acetal resin composition applied to the manufacture of laminated glass may include a UV stabilizer (UV absorber), and a benzotriazole-based compound may be applied as the UV stabilizer.

The benzotriazole-based compound may have a variation of bond structure thereof generated from interaction between a hydroxyl group inside the molecule and a nitrogen included in a triazole ring located near the hydroxyl group. At this time, if a metal ion gets involved in the interaction, the effect of the benzotriazole-based compound as a UV stabilizer may be degraded. Also, the benzotriazole-based compound may form a chelate ring by coordinate covalent bond with a polyvalent metal ion, and the benzotriazole-based compound having a chelate ring formed therein in this manner may not sufficiently function as a UV stabilizer, thereby weakening durability of the entire film.

As the UV stabilizer, a conventional benzotriazole-based compound applicable as a UV stabilizer may be applied without limit, and in detail, Chemisorb 12, Chemisorb 79, Chemisorb 74, or Chemisorb 102 available from CHEMIPRO KASEI KAISHA, LTD may be used, or Tinuvin 328, Tinuvin 329, or Tinuvin 326 available from BASF SE may be used.

In the present disclosure, the metal salt compound having an excellent adhesion regulation effect even in a small amount is added to the composition, thereby allows the function as a UV stabilizer of a benzotriazole-based compound to be sufficient and enhance durability of the film itself. For this purpose, the polyvinyl acetal resin composition of the present disclosure includes a metal salt compound, which is a metal salt of hydroxyl carboxyl acid having two to sixteen carbon atoms, or an anion of the same.

The polyvinyl acetal resin composition may include the metal salt compound in an amount of 16 parts by weight or less, 12 parts by weight or less, or 1 to 10 parts by weight based on the benzotriazole-based compound of 100 parts by weight. When the metal salt compound is included in an amount of less than 1 parts by weight based on the benzotriazole-based compound of 100 parts by weight, the adhesion regulation effect may be not sufficient, and when the metal salt compound is included in an amount of more than 16 parts by weight, moisture resistance may be degraded instead.

The composition may further include an additive selected from the group consisting of an antioxidant, a heat stabilizer, an IR absorber, and a combination thereof as required. The additive may be included in at least one layer among respective layers in the above or may be included in the entire film.

Long term durability such as thermal stability and light stability, and anti-scattering performance of the film may be improved more by including the additive in the composition.

As the antioxidant, a hindered amine-based antioxidant or a hindered phenol-based antioxidant may be used. Specifically, in the process of manufacturing polyvinyl butyral (PVB) which needs a processing temperature of 150° C. or higher, a hindered phenol-based antioxidant is more preferrable. The hindered phenol-based antioxidant, for example, may be Irganox 1976, 1010, or so on available from BASF SE.

As the heat stabilizer, a phosphite-based heat stabilizer may be used considering suitability with the antioxidant. The heat stabilizer, for example, may be Irgafos 168 available from BASF SE.

As the IR absorber, ITO, ATO, or AZO may be used, but the present disclosure is not limited thereto.

The film for laminated glass according to another embodiment of the present disclosure includes: a film; and an adhesion layer disposed on the surface of the film, and the adhesion layer includes a polyvinyl acetal resin, a plasticizer, an adhesion regulator, and a benzotriazole-based compound. The adhesion regulator includes a metal salt compound, which is a metal salt of hydroxyl carboxyl acid having two to sixteen carbon atoms, or an anion of the same. The metal salt compound may be included in an amount of 16 parts by weight or less based on the benzotriazole-based compound of 100 parts by weight.

The detailed description on the polyvinyl acetal resin, the plasticizer, the metal salt compound, or the anion of the same overlaps with the above description, and thus further description is omitted.

The adhesion regulator may have an adhesion regulation effect $E_{aca}$ per 0.1 wt % of the adhesion regulator based on a solid content, calculated by below Equation 1, and may be 15 or more;

$$E_{aca} = \frac{PVcs - PVss}{ACA} \times 0.1 \qquad \text{[Equation 1]}$$

wherein, in Equation 1, PVcs is a pummel value of a comparative reference sample not comprising the adhesion regulator, PVss is a pummel value of a sample comprising the adhesion regulator, and ACA is an amount (wt %) of the solid content of the adhesion regulator based on a total weight of the adhesion layer.

The ACA refers to the amount of the solid content of the metal salt compound based on a total weight of the adhesion layer (wt %), and when the film for laminated glass is a multilayer structure including additive layers such as a sound insulating layer and a HUD functional layer, the ACA is based on the amount included in a surface layer (adhesion layer) bonding to a glass.

The ACA refers to the amount of the solid content of the metal salt compound based on a total weight of the adhesion layer (wt %), and when the film for laminated glass is a monolayer structure, the ACA is based on the amount included in a surface layer (adhesion layer) bonding to a glass.

The adhesion regulator may have the adhesion regulation effect calculated by the Equation 1, and the adhesion regulation effect per 0.1 wt % of the adhesion regulator may be 15 to 45, or 18 to 43.

The adhesion regulator may have the adhesion regulation effect calculated by the Equation 1, and the adhesion regulation effect per 0.1 wt % of the adhesion regulator may be 20 to 42, or 23 to 41.

When having such an adhesion regulation effect, the metal salt compound can obtain an excellent adhesion regulation effect, even when small amount of the metal salt compound is included in the composition and can minimize adverse effects possible to be caused in the manufactured film due to inclusion of the metal ion.

The film for laminated glass may have a yellow index variation of 3.0 or less measured by ASTM (American Society for Testing and Materials) E313. In detail, the film for laminated glass may have a yellow index variation value of 3.0 or less, or 0.01 to 3.0 between before and after being kept for two weeks in an isothermal-iso humidity chamber at 65° C. and 95% rh. The film for laminated glass may have a yellow index variation value of 0.8 to 2.8, or 0.8 to 2.5 between before and after being kept for two weeks in an isothermal-iso humidity chamber at 65° C. and 95% rh. Such a decrease of yellow index variation value may be considered as a result of a desired excellent adhesion regulation effect obtained from applying the metal salt compound in a comparatively small amount.

The film for laminated glass may have a haze value of 3% or less, or 2.5% or less. The film for laminated glass may have a haze value of 0.1 to 2%.

The method of manufacturing the film for laminated glass will be described. The film for laminated glass may be manufactured by using the polyvinyl acetal resin composition described as one embodiment of the present disclosure in the above. At this time, the metal salt compound (or the adhesion regulator) may be mixed into the composition in a state of a solution dissolved in a solvent, and an amount of the solution is converted into an amount of the solid content thereof to be added. Deionized water may be applied as the solvent, but any method for dispersing a metal salt compound and letting the metal salt compound to be mixed well with the composition may be applied.

The polyvinyl acetal resin composition may be manufactured into a film form by being placed in an extruder (ex. twin screw extruder) and being melted for being discharged with having a thickness controlled through a T-die. When the film for laminated glass is a multilayer structure, the polyvinyl acetal resin composition described above may be applied to a surface layer, a composition with different components may be applied to an interlayer and the like. Thereafter, the layers applied with the composition may be melt extruded respectively in an extruder, laminated through a laminating device such as a feed block and a multi manifold, and then shaped into a film form in a T-die (co-extrusion method). However, any method for manufacturing a film for laminated glass may be applicable to the film for laminated glass without limit.

A thickness of the film for laminated glass may be 0.4 mm or more, in detail, 0.4 to 1.6 mm, 0.5 to 1.2 mm, or 0.6 to 0.9 mm. When the film is manufactured to have such a thickness, it is possible to provide a film having excellent impact resistance and penetration resistance with being thin and light.

The laminated glass according to another embodiment of the present disclosure includes: a plurality of glass sheets; and the laminate including the film for laminated glass described above disposed between the plurality of glass sheets.

The laminated glass may include: a first glass substrate; a second glass substrate opposite to the first glass substrate; and the film for laminated glass disposed between the first glass substrate and the second glass substrate to be bonded to the first glass substrate and the second glass substrate.

The two pieces of glass (the first glass substrate and the second glass substrate) are described as glass, but any light transmission panel is applicable, for example, a plastic and the like may be applied.

Descriptions on the detailed structure, composition, characteristics, method of manufacture and so on overlap with the above description and thus further description is omitted.

The laminated glass may have an average whitening occurrence distance of 6 mm or less, 0 to 6 mm, 0.1 to 5 mm, or 0.1 to 4.5 mm measured by keeping a sample having an area of 100 mm×100 mm for two weeks in an isothermal-iso humidity chamber at 65° C. and 95% rh. These average whitening occurrence distance means having a considerably excellent moisture resistance even in a condition of high temperature and humidity.

The laminated glass may have a bubble in a number of less than 5, occurring in a sample of laminated glass having an area of 100 mm×100 mm, after being kept for 12 hours in an oven at 140° C. and being taken out. This also means having excellent properties such as remarkably reduced bubble occurrence even in a harsh condition.

Hereinafter, the present disclosure will be described in further detail by specific embodiments. The below embodiments are for illustration only and the scope of the present application is not limited thereto.

1. Preparation of Materials

1) Preparation of an Additive Composition

Irganox 1010 as an antioxidant and Irgafos 168 as a heat stabilizer of 0.1 wt %, and Tinuvin P as a benzotriazole-based UV absorber of 0.3 wt % based on a total weight of the film were mixed into an additive composition.

2) Preparation of Dissolved Adhesion Regulator (A)

Respective metal salts used in Examples 1 to 4 and Comparative Examples 1 to 2 of the below Table 1 were dissolved in deionized water (DI water) in a density of 20 wt % based on the solid content and manufactured into dissolved adhesion regulator (A).

3) Preparation of Dissolved Adhesion Regulator (B)

A metal salt (potassium 2-hydroxypropanoate) used in Comparative Example 3 was dissolved in deionized water in a concentration of 50 wt % based on the solid content and manufactured into dissolved adhesion regulator (B).

4) Preparation of a Polyvinyl Butyral Resin

A polyvinyl acetal resin having a polymerization of 1700 and a saponification of 99 and n-butanal were put into a reactor to allow a general synthesis process of a polyvinyl butyral resin to proceed and thereby a polyvinyl butyral resin having a hydroxyl group of 18.5 wt %, a butyral group of 80.8 wt %, and an acetyl of 0.7 wt % was obtained.

2. Preparation of Polyvinyl Butyral Films

1) Preparation of Films of Examples 1 to 4 and Comparative Examples 1 to 2

The polyvinyl butyral resin of 72.49 wt % prepared in the above, 3G8 as a plasticizer of 27 wt %, the additive composition of 0.5 wt %, and the dissolved adhesion regulator of 0.05 wt % (solid content of 0.01 wt %) were put into a twin-screw extruder and extruded to manufacture a film with a total thickness of 780 μm through a T-die.

2) Preparation of a Film of Comparative Example 3

The polyvinyl butyral resin of 72.45 wt %, 3G8 as a plasticizer of 27 wt %, the additive of 0.5 wt %, and the dissolved adhesion regulator of 0.1 wt % (solid content of 0.05 wt %) were put into a twin-screw extruder and extruded to manufacture a film with a total thickness of 780 μm through a T-die.

During manufacture of the above film, distilled water was evaporated and removed in the extruding process such that the above wt % was calculated based on the solid content of the adhesion regulator.

TABLE 1

| wt % | Example 1 | Example 2 | Example 3 | Example 4 | Comparative Example 1 | Comparative Example 2 | Comparative Example 3 |
|---|---|---|---|---|---|---|---|
| Adhesion Regulator | Potassium 2-hydroxy-propanoate | Potassium 3-hydroxy-butanoate | Magnesium 3-hydroxy-3-methylbutyrate | Sodium 5-hydroxy-decanoate | Potassium hydroxy-stearate | Potassium propanate | Potassium 2-hydroxy-propanoate |
| Polyvinyl Butyral Resin | 72.49 | 72.49 | 72.49 | 72.49 | 72.49 | 72.49 | 72.45 |
| Plasticizer | 27 | 27 | 27 | 27 | 27 | 27 | 27 |
| Additive Composition | 0.5 | 0.5 | 0.5 | 0.5 | 0.5 | 0.5 | 0.5 |
| Dissolved Adhesion Regulator (Based on Solid Content) | 0.01 | 0.01 | 0.01 | 0.01 | 0.01 | 0.01 | 0.05 |
| The Sum | 100 | 100 | 100 | 100 | 100 | 100 | 100 |

3. Property Evaluation of Polyvinyl Butyral Films 1) 3-Point Dispersion Evaluation Samples with a size of 5 mm×5 mm were taken in each width direction, from the center, a point to right 30 cm from the center, and a point to left 30 cm from the center, in a manufactured film of Example 2, and analysis on the residual amount thereof was performed by the below method.

Samples taken above were dissolved in THF, and subsequently, ACN (acetonitrile) was added by a small amount such that only materials having high molecular weight were re-precipitated. Only upper solution including dissolved materials having low molecular weight (500 to 2000 amu) was separated and analyzed by HR LC-MS.

Figure 2A:
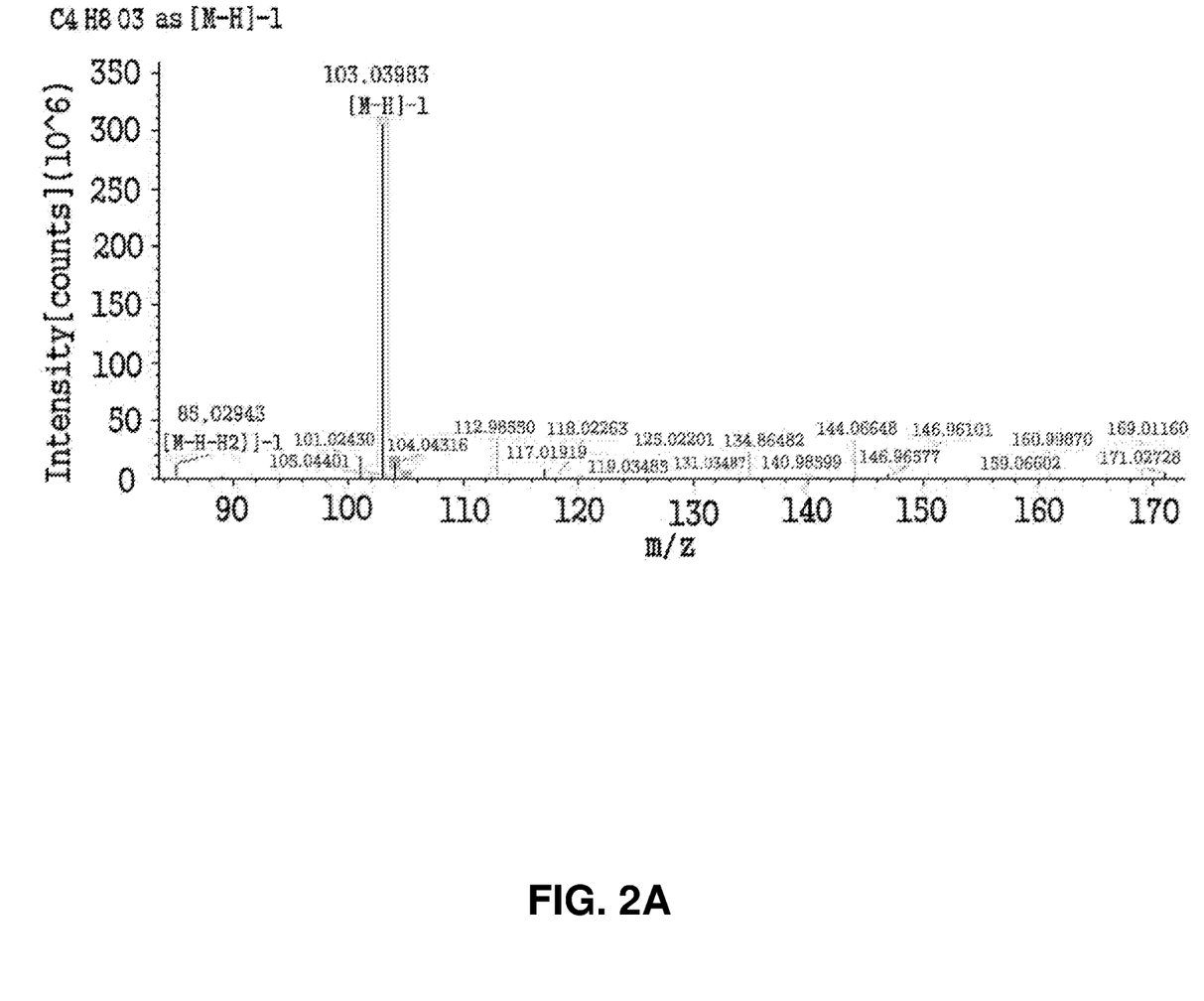
FIG. 2A is a result of detecting 3-hydroxybutanoate (M.w=103.04 g/mol, RT=0.765 min) by MS/MS method for checking ingredients.

The separated samples were separated from the ACN solution of 10% by using C18 column (Hypersil Gold C18), detected at 210 nm in a condition of elution with an ACN of 100% after 9 minutes, subsequently ionized by ESI mode at 320 degrees to analyze their components by MS/MS method, and thereby 3-hydroxylbutanoate (M.w=103.04 g/mol, RT=0.765 min) was detected (refer to FIG. 2A).

For quantitative analysis of 3-hydroxylbutanoate, samples in which 3-hydroxylbutanoate of 50 ppm, 100 ppm, and 500 ppm were respectively added in a fixed quantity were prepared and measured in the same condition as above to make a calibration curve, such that the 3-hydroxybutanoate detected in the resin was quantified.

Figure 2B:
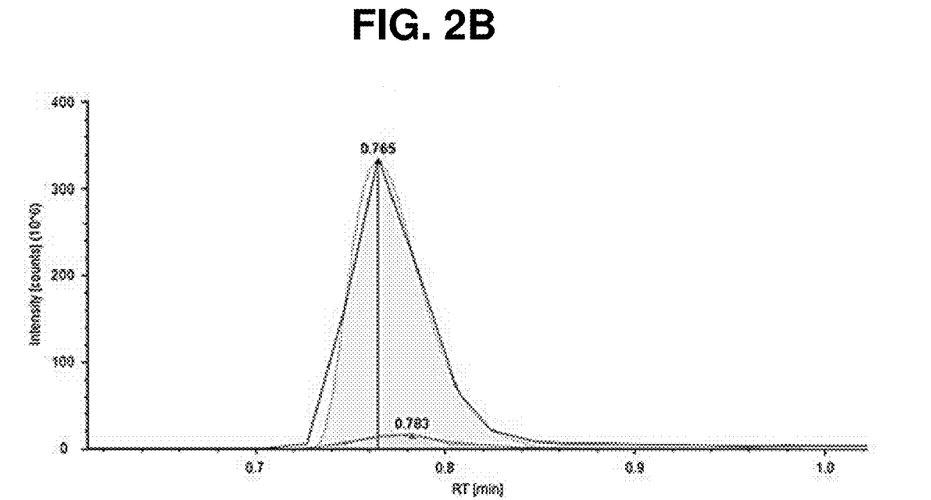
FIG. 2B is a graph showing the result of LC-MS measured with the sample of Example 2.

As a result of detecting in the same process as above, the result was evaluated as Pass, if the difference between the detected amount and the input was 10% or less (i.e., above 90% and below 110%), or evaluated as Fail, if the difference between the detected amount and the input was more than 10% (i.e., less than 90% or more than 110%). Results of Example 1 and Example 3 were also evaluated by a similar method, and the results were shown in below Table 2. In addition, LC-MS result graph measured with a sample of Example 2 was shown in FIG. 2B.

2) Preparation of Laminated Glass Samples for Durability/Moisture Resistance Evaluation Polyvinyl acetal films of Examples 1 to 4, and Comparative Examples 1 to 3 were kept for a week at 20° C. and 30% RH, and then cut into a size of 100 mm×100 mm (width× length), and two pieces of clear glass of 2.1 T (mm, same as below) were placed in both sides thereof such that pre-laminating of the films having a laminated structure of 2.1 T glass-film-2.1 T glass was performed for 20 seconds in a vacuum laminator at 120° C. and 1 atmospheric pressure.

Thereafter, main laminating of the laminates of glass-film-glass, which were pre-laminated, was performed thereby obtaining laminated glass samples. Heating time for 25 minutes from room temperature to 140° C. and maintaining time for 25 minutes at 140° C. were applied as the condition of main laminating.

3) Method of Evaluating Yellow Index Variation (d-YI)

Initial values of yellow index ($YI_{initial}$) at the center of the laminated glass samples manufactured as above were measured by using Ultra Scan Pro available from HUNTERLAB in the condition of D65 and 10 degrees according to ASTM E313 standard. Samples whose initial values of yellow index had been measured were kept for two weeks in an isothermal-iso humidity chamber at 65° C. and 95% rh, taken out and measured again by the same method as above for measuring final values of yellow index ($YI_{final}$), such that the difference of yellow index was calculated by following Equation 2 and the result was shown in below Table 2.

$$d\text{-}YI = YI_{final} - YI_{initial} \quad \text{[Equation 2]}$$

4) Measurement of Whitening Occurrence Distance

Figure 1:
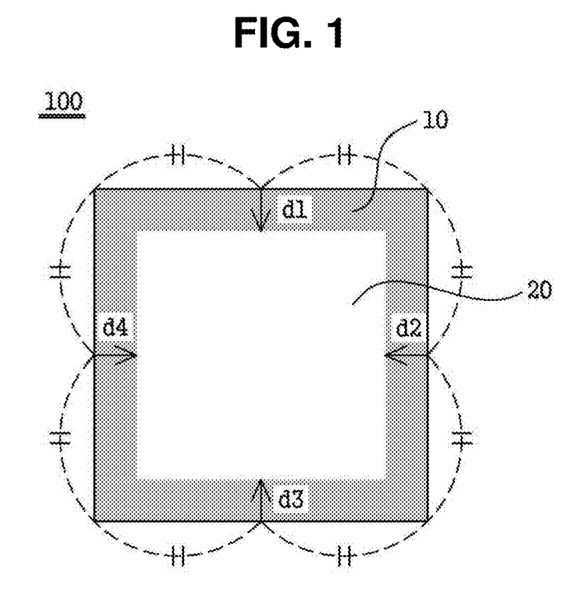
FIG. 1 is a drawing for illustrating a method of measuring a whitening occurrence distance measured in embodiments of the present disclosure.

The laminated glass samples manufactured as above were kept for two weeks in an isothermal-iso humidity chamber at 65° C. and 95% rh and taken out for checking a part (the area where a whitening phenomenon occurred) where haze occurred from the center of four sides thereof with naked eyes, such that the distance was measured with a ruler (refer to FIG. 1), and the average value of four sides was calculated according to below Equation 3 to be shown as a whitening occurrence distance (mm) in below Table 2.

$$\text{Average Whitening Occurrence Distance} = (d1+d2+d3+d4) \div 4 \quad \text{[Equation 3]}$$

In Equation 3 above, the distances where a whitening phenomenon occurred were measured at the center of first to fourth sides and respectively referred to as d1 to d4 (mm as the unit).

5) Evaluation of Bubble Occurrence

The laminated glass samples manufactured as above were kept for 12 hours in an oven at 140° C. and taken out for checking the number of bubbles occurred in the laminated glass samples. It was evaluated as Pass, if bubbles occurred in the number of less than 5 per an area of 100 mm×100 mm, or evaluated as Fail, if the number of bubbles occurred per an area of 100 mm×100 mm was more than 5, thereby being shown in below Table 2.

6) Pummel Adhesion Evaluation

Adhesion between a polyvinyl acetal film and glass was evaluated through pummel adhesion evaluation. In detail, PVB films manufactured in Examples 1 to 4 and Comparative Examples 1 to 3 were kept for a week at 20° C. and 30% RH, and then two pieces of clear glass of 2.1 T were placed in both sides thereof thereby manufacturing laminated structures of 2.1 T glass-film-2.1 T glass of 100 mm×150 mm (width×length). The laminated structures were pre-laminated for 20 seconds at a vacuum laminator at 150° C. and 1 atmospheric pressure. Thereafter, main laminating of the pre-laminated laminated structures was performed in the condition of heating time for 25 minutes from room temperature to 140° C. and maintaining time for 25 minutes at 140° C., thereby obtaining samples in a laminated glass form.

The samples in a laminated glass form were cooled for 4 hours at −20° C., and then hit with a hammer in succession, and the amounts of glass remaining in the films were measured. Depending on the amount of remaining glass bonded to glass after hitting, a case in which all glass was removed was evaluated as grade 0, and a case in which all glass remained was evaluated as grade 8, such that the values from grade 0 to grade 8 were decided and the result was shown in below Table 2.

7) Evaluation of Adhesion Regulation Effect ($E_{aca}$) Per an Applied Amount of Adhesion Regulator The adhesion regulation effect of respective adhesion regulators was evaluated by applying below Equation 1.

$$E_{aca} = \frac{PVcs - PVss}{ACA} \times 0.1 \quad \text{[Equation 1]}$$

The $E_{aca}$ shows an adhesion regulation effect of an adhesion regulator (based on solid content) per 0.1 wt %, the PVcs is a pummel value of a comparative reference sample manufactured by the method described below, and the PVss is a pummel value of an Example or a Comparative Example. The ACA is an input amount (wt %) of the solid content of the metal salt based on the total weight of the film.

The pummel value of the comparative reference sample was measured by manufacturing a PVB film not including the metal salt using the method described below and measuring a pummel value thereof.

The film of the comparative reference sample was manufactured by the same method as the above Examples and Comparative Examples except for not adding the additive metal salt. In detail, the comparative reference sample was manufactured through processes of putting a polyvinyl butyral resin of 72. 5 wt %, 3G8 as a plasticizer of 27 wt %, and an additive of 0.5% into a twin-crew extruder and extruding by a T-die, thereby obtaining a film with a thickness of 780 µm. This film of comparative reference sample was kept for a week at 20° C. and 30% RH, and then two pieces of clear class of 2.1 T were placed in both sides thereof such that the film having a laminated structure of 2.1 T glass-film-2.1 T glass was pre-laminated for 20 seconds in a vacuum laminator at 150° C. and 1 atmospheric pressure, and main laminating thereof was performed in the condition of heating time for 25 minutes from room temperature to 140° C. and maintaining time for 25 minutes at 140° C. thereby obtaining the laminated glass sample. The pummel adhesion of the comparative reference sample manufactured in a laminated glass form was evaluated by the same method as above. The pummel value of the comparative reference sample was graded as 8.

Values calculated according to the above Equation 1 by applying the pummel value of the comparative reference sample and pummel values of Examples 1 to 4 and Comparative Examples 1 to 3 were shown in below Table 2.

Additionally, because Examples 1 to 4 achieve an excellent adhesion regulation effect even with the adhesion regulator in a small amount, they also show excellent results in yellow index variation and whitening occurrence distance, and particularly this is the result considerably different from that of Comparative Example 3, which includes the adhesion regulator in a large amount. Meanwhile, in the case of Comparative Example 1, which was evaluated as having the most excellent adhesion regulation effect, the result of bubble occurrence evaluation was shown as Fail.

From the results above, the adhesion regulators applied in Examples 1 to 4 were confirmed as being excellent in adhesion regulation effect with even satisfying various properties such as durability, moisture resistance, and bubble occurrence evaluation.

While this disclosure includes specific examples, it will be apparent after an understanding of the disclosure of this application that various changes in form and details may be

TABLE 2

|  | Example 1 | Example 2 | Example 3 | Example 4 | Comparative Example 1 | Comparative Example 2 | Comparative Example 3 |
|---|---|---|---|---|---|---|---|
| Type of Adhesion Regulator | Potassium 2-hydroxy-propanoate | Potassium 3-hydroxy-butanoate | Magnesium 3-hydroxy-3-methylbutyrate | Sodium 5-hydroxy-decanoate | Potassium hydroxy-stearate | Potassium propanoate | Potassium 2-hydroxy-propanoate |
| The Number of Carbon Atoms inside the Molecule | 3 | 4 | 5 | 10 | 18 | 3 | 3 |
| Molecule Form of Adhesion Regulator | Linear Type | Linear Type | Branched Type | Linear Type | Linear Type | Linear Type | Linear Type |
| Input of Adhesion Regulator (Based on Solid Content, wt %) | 0.01 | 0.01 | 0.01 | 0.01 | 0.01 | 0.01 | 0.05 |
| Content of Benzotriazole-based Compound (wt %) | 0.3 | 0.3 | 0.3 | 0.3 | 0.3 | 0.3 | 0.3 |
| Content of Metal Salt Compound per Benzotriazloe-based Compound of 100 parts by weight (Based on Weight) | 3.33 | 3.33 | 3.33 | 3.33 | 3.33 | 3.33 | 16.67 |
| 3-point Dispersion Evaluation | pass | pass | pass | pass | pass | pass | pass |
| Yellow Index Variation | 2.6 | 2.4 | 2 | 1.1 | 0.4 | 3.3 | 6.6 |
| Whitening Occurrence Distance (Moisture Resistance, mm) | 4 | 4 | 3.8 | 2.2 | 1 | 7.1 | 13.6 |
| Bubble Occurrence Evaluation | pass | pass | pass | pass | fail | pass | pass |
| Pummel Adhesion Evaluation | 6 | 5.5 | 5 | 4 | 3 | 7 | 0.5 |
| Adhesion Regulation Effect per Adhesion Regulator of 0.1 wt %* | 20 | 25 | 30 | 40 | 50 | 10 | 15 |

*Adhesion Regulation Effect per Adhesion Regulator of 0.1 wt % was calculated by the method described as 7) above.

Referring to Table 2 above, adhesion regulation effect of Examples 1 to 4 is confirmed as being excellent by far compared to Comparative Examples 1 to 3. This means that when the adhesion regulator in only a small amount was applied, it is possible to obtain a sufficient adhesion regulation effect.

In Examples 1 to 4, it was confirmed that sufficient adhesion regulation effect can be obtained, and simultaneously excellent moisture resistance can be achieved by applying the adhesion regulator in a small amount in this manner.

made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A polyvinyl acetal resin composition comprising:
a polyvinyl acetal resin, a plasticizer, a metal salt compound, and a benzotriazole-based compound,
wherein the metal salt compound is a metal salt of hydroxyl carboxyl acid having two to sixteen carbon atoms,
wherein the metal salt compound is comprised in an amount of less than 0.05 wt % based on a total weight of the polyvinyl acetal resin composition, and
wherein the metal salt compound is comprised in an amount of 16 parts by weight or less based on the benzotriazole-based compound of 100 parts by weight.

2. The polyvinyl acetal resin composition of claim 1, wherein the metal salt compound comprises a carboxyl anion having three to six carbon atoms and a hydroxyl group inside the metal salt compound, and a monovalent metal cation salt.

3. The polyvinyl acetal resin composition of claim 1, wherein the metal salt compound comprises a carboxyl anion having six to twelve carbon atoms and a hydroxyl group inside the metal salt compound, and a divalent metal cation salt.

4. The polyvinyl acetal resin composition of claim 1, wherein the metal salt compound may comprise one or two hydroxyl group inside the metal salt compound.

5. The polyvinyl acetal resin composition of claim 1, wherein the metal salt compound is a branched compound or a linear compound.

6. The polyvinyl acetal resin composition of claim 1, wherein the metal salt compound is a compound represented by the following Formula 1:

[Formula 1]

wherein, in Formula 1, m1 is an integer of 0 to 5, n is 1 or 2, and M is sodium (Na), potassium (K), or magnesium (Mg).

7. The polyvinyl acetal resin composition of claim 1, wherein the metal salt compound is a compound represented by the following Formula 2:

[Formula 2]

wherein, in Formula 2, m2 is an integer of 0 to 5, n is 1 or 2, and M is sodium (Na), potassium (K), or magnesium (Mg).

8. The polyvinyl acetal resin composition of claim 1, wherein the metal salt compound is a compound represented by the following Formula 3:

[Formula 3]

wherein, in Formula 3, m3 and m4 are respectively independent integers of 0 to 5, at least one of m3 and m4 is not 0, n is 1 or 2, and M is sodium (Na), potassium (K), or magnesium (Mg).

9. A film for laminated glass comprising:
a film; and
an adhesion layer disposed on a surface of the film,
wherein the adhesion layer comprises a polyvinyl acetal resin, a plasticizer, an adhesion regulator, and a benzotriazole-based compound,
wherein the adhesion regulator comprises a metal salt compound, which is a metal salt of hydroxyl carboxyl acid having two to sixteen carbon atoms, or an anion of the same, and
wherein the metal salt compound is comprised in an amount of 16 parts by weight or less based on the benzotriazole-based compound of 100 parts by weight.

10. The film for laminated glass of claim 9,
wherein the adhesion regulator has an adhesion regulation effect $E_{aca}$ per 0.1 wt % of the adhesion regulator based on a solid content, calculated by below Equation 1, and is 15 or more;

$$E_{aca} = \frac{PVcs - PVss}{ACA} \times 0.1$$ [Equation 1]

wherein, in Equation 1, PVcs is a pummel value of a comparative reference sample not comprising the adhesion regulator, PVss is a pummel value of a sample comprising the adhesion regulator, and ACA is an amount (wt %) of the solid content of the adhesion regulator based on a total weight of the adhesion layer.

11. The film for laminated glass of claim 9,
wherein a yellow index variation of the film is 3.0 or less between before and after being kept for two weeks in an isothermal-iso humidity chamber at 65° C. and 95% rh.

12. The film for laminated glass of claim 9,
wherein the metal salt compound comprises one or two hydroxyl group inside the metal salt compound.

13. The film for laminated glass of claim 9,
wherein the metal salt compound is a branched compound or a linear compound.

14. The film for laminated glass of claim 9,
wherein the metal salt compound is a compound represented by the following Formula 1:

[Formula 1]

wherein, in Formula 1, m1 is an integer of 0 to 5, n is 1 or 2, and M is sodium (Na), potassium (K), or magnesium (Mg).

15. The film for laminated glass of claim 9,
wherein the metal salt compound is a compound represented by the following Formula 2:

[Formula 2]

wherein, in Formula 2, m2 is an integer of 0 to 5, n is 1 or 2, and M is sodium (Na), potassium (K), or magnesium (Mg).

16. The film for laminated glass of claim 9,
wherein the metal salt compound is a compound represented by the following Formula 3:

[Formula 3]

wherein, in Formula 3, m3 and m4 are respectively independent integers of 0 to 5, at least one of m3 and m4 is not 0, n is 1 or 2, and M is sodium (Na), potassium (K), or magnesium (Mg).

17. The film for laminated glass of claim 9,
wherein the adhesion regulator comprises a compound selected from the group consisting of potassium 2-hydroxypropanoate, potassium 3-hydroxybutanoate, magnesium 3-hydroxy-3-methylbutyrate, sodium 5-hydroxydecanoate and a combination thereof.

18. A laminated glass comprising:
a plurality of glass sheets; and
a laminated body comprising the film for laminated glass of claim 9 disposed between the plurality of glass sheets.

19. The laminated glass of claim 18,
wherein an average whitening distance of the laminated glass with a size of 100 mm×100 mm measured after being kept for two weeks in an isothermal-iso-humidity chamber at 65° C. and 95% rh is 6 mm or less.

20. The laminated glass of claim 18,
wherein a number of bubbles occurred in the laminated glass with a size of 100 mm×100 mm after being kept for 12 hours in an oven at 140° C. and taken out is less than 5.

* * * * *